United States Patent
Hafner et al.

(10) Patent No.: US 7,536,588 B2
(45) Date of Patent: May 19, 2009

(54) METHOD FOR SERVICING STORAGE DEVICES IN A BLADED STORAGE SUBSYSTEM

(75) Inventors: James Lee Hafner, San Jose, CA (US); Krishnakumar Surugucchi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 11/350,247

(22) Filed: Feb. 8, 2006

(65) Prior Publication Data

US 2007/0226533 A1 Sep. 27, 2007

(51) Int. Cl.
*G06F 11/00* (2006.01)
(52) U.S. Cl. .................................. 714/6; 714/5; 714/20
(58) Field of Classification Search ..................... 714/5, 714/6, 42, 20
See application file for complete search history.

(56) References Cited

U.S. PATENT DOCUMENTS

| | | | |
|---|---|---|---|
| 5,303,244 A | 4/1994 | Watson | |
| 5,488,701 A * | 1/1996 | Brady et al. | 714/6 |
| 5,822,782 A | 10/1998 | Humlicek et al. | |
| 5,835,694 A | 11/1998 | Hodges | |
| 5,913,926 A * | 6/1999 | Anderson et al. | 714/6 |
| 6,067,635 A * | 5/2000 | DeKoning et al. | 714/6 |
| 6,513,093 B1 | 1/2003 | Chen et al. | |
| 7,062,673 B2 * | 6/2006 | Ng | 714/6 |
| 2003/0120864 A1 | 6/2003 | Lee et al. | |
| 2004/0143703 A1 | 7/2004 | Emberty et al. | |
| 2004/0260967 A1 | 12/2004 | Guha et al. | |
| 2005/0060609 A1* | 3/2005 | El-Batal et al. | 714/20 |
| 2005/0193237 A1* | 9/2005 | Topham | 714/6 |

* cited by examiner

*Primary Examiner*—Yolanda L Wilson
(74) *Attorney, Agent, or Firm*—Shimokaji & Associates, PC

(57) ABSTRACT

A bladed storage servicing system comprising a RAID layout facilitates the removal of one or more functional storage devices in a tray of the bladed storage subsystem in order to service a failed storage device. Upon removal of the tray from the bladed storage subsystem, the system designates the functional storage devices on the tray as temporarily removed. The system logs writes to the removed functional storage devices so that the functional storage devices can be returned to consistency when replaced in the bladed storage subsystem. The system manages reads to the removed functional storage devices through reconstruction from active storage devices in the bladed storage subsystem. Upon reinsertion of the tray in the bladed storage subsystem, the system verifies the identities of the functional storage devices and resynchronizes the functional storage devices to ensure data consistency.

9 Claims, 5 Drawing Sheets

METHOD FOR SERVICING STORAGE DEVICES IN A BLADED STORAGE SUBSYSTEM

FIELD OF THE INVENTION

The present invention generally relates to storage systems, and in particular to a storage array configured for easy service of storage devices or replacement of failed storage devices in bladed storage subsystems.

BACKGROUND OF THE INVENTION

Blade-based computing systems are increasingly becoming popular in data center deployments. Blade-based systems provide efficient utilization of floor space, ease of installation and management, improved RAS (Reliability Availability and Serviceability), reduction in cabling requirements, integrated networking, and integrated storage.

In one approach to blade-based computing systems, storage controllers are packaged into blade form-factors and integrated into the same enclosure as server blades. Storage devices such as disk drives are housed in a separate enclosure. To further improve packaging densities and to realize a complete system in a frame (i.e., a datacenter in a box) methods are being investigated to package disk drives into blades. This blade-packaging scheme for a bladed storage subsystem provides a complete solution for medium sized configurations, achieves high density in drive packaging, and minimizes cabling requirements.

For example, two or more disk drives are mounted on a tray that is inserted into a canister, an enclosure that houses the trays and a connection interface. Additional trays are also inserted into the canister. This configuration, with multiple drives per tray, achieves higher drive density and efficient utilization of the available space along the depth of the frame as opposed to housing only a single drive per tray.

A bladed storage subsystem comprising more than one disk drive per tray presents a problem in removal and replacement of failed drives. Removing a tray comprising two or more disk drives to replace one failed drive implies that functional drives are also being removed from the storage system. A proposed solution requires the use of higher fault-tolerant RAID codes (for example RAID 6 or RAID 51) that can tolerate the removal of all the drives on a tray. However, in this solution, some schemes (such as RAID 51) do not have high storage efficiency. Other schemes (such as 3-fault-tolerant schemes) exhibit an increased write penalty. Furthermore, some RAID schemes (such as RAID 6) may not be able to support configurations with three or more drives per tray.

Another proposed solution requires relocating all data on the tray with the failed drive onto a spare tray before removing the tray with a failed disk drive. However, relocating all data to a spare tray requires that the service action cannot be performed until the lengthy relocation operation is completed. Furthermore, spare trays may not be available in all configurations.

Accordingly, a solution is required to facilitate removal and replacement of a single failed drive from a tray holding more than one drive that does not affect the storage efficiency, allows the maintenance action to take place after a drive failure is detected without waiting for completion of a lengthy operation such as a data relocation, does not limit the number of drives per tray, and does not depend on the availability of spare trays.

What is therefore needed is a system and an associated method for servicing storage devices in a bladed storage subsystem. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for servicing storage devices in a bladed storage subsystem. A tray of the bladed storage subsystem comprises one or more functional storage devices.

The present system introduces the concept of temporary removal of functional storage devices. Upon detection of the removal of the tray from the bladed storage subsystem, the present system designates the functional devices on the removed tray as temporarily removed. Subsequently, it logs all writes to these functional storage devices so that the functional storage devices can be returned to consistency when replaced in the bladed storage subsystem. The present system manages reads to the removed functional storage devices through reconstruction from some or all of a plurality of storage devices in the bladed storage subsystem that are not removed from the bladed storage subsystem. Upon reinsertion of the tray in the bladed storage subsystem, the present system resynchronizes the functional storage devices to ensure data consistency.

The present system verifies the identities of the functional storage devices on reinsertion into the bladed storage subsystem. The bladed storage subsystem comprises a RAID layout. The RAID layout comprises no more storage devices per tray than allowed by the fault tolerance of the RAID scheme.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
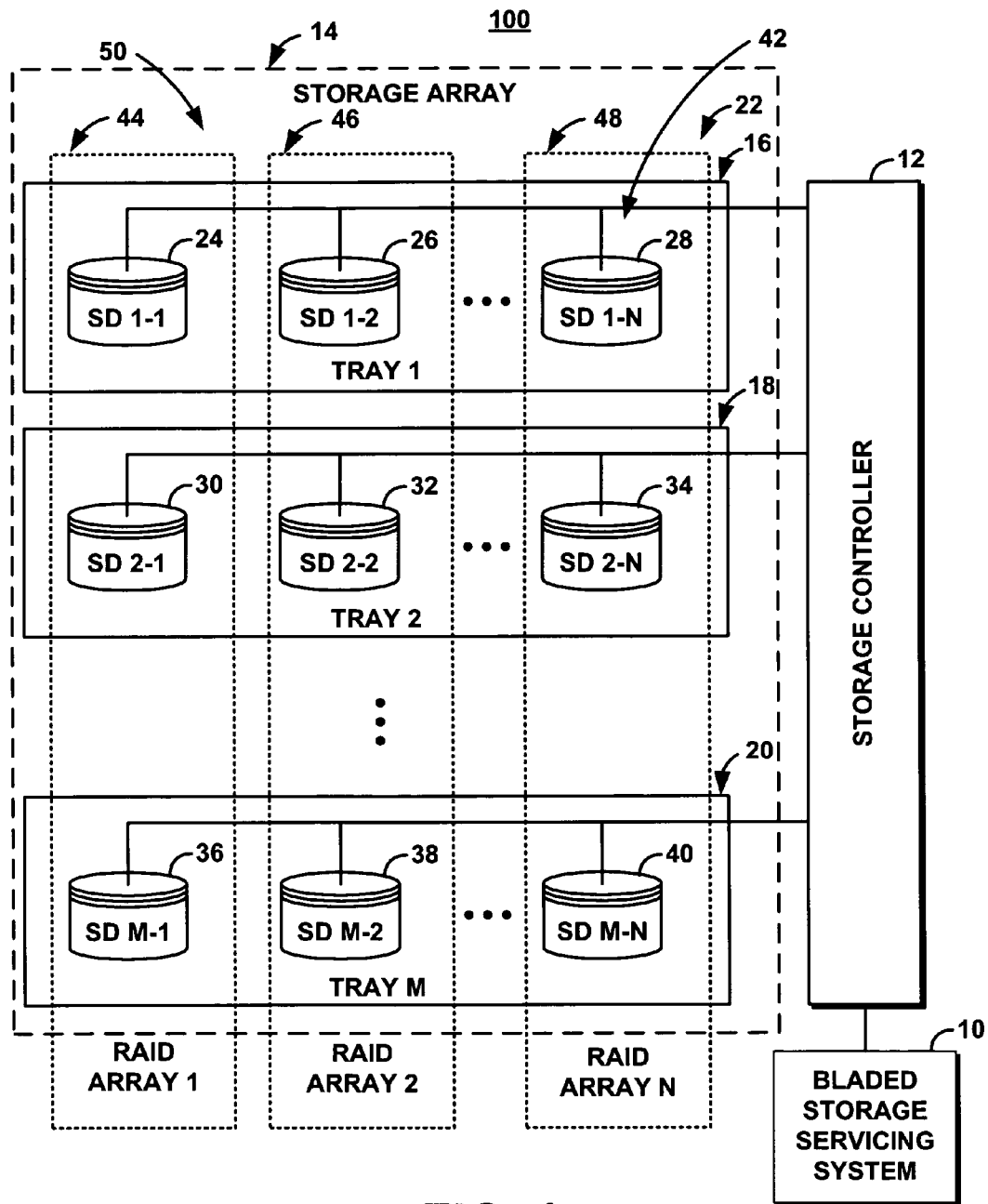
FIG. 1 is a schematic illustration of an exemplary operating environment comprising a storage system array in which a bladed storage servicing system of the present invention can be used.

FIG. 1 illustrates an exemplary high-level architecture of a storage system 100 comprising a system and an associated method (the "bladed storage servicing system 10" or the "system 10"). System 10 includes a software programming code or computer program product that is typically embedded within, or installed on a computer. Alternatively, this program can be saved on a suitable storage medium such as a diskette, a CD, a hard drive, or like devices.

The storage system 100 comprises a storage controller 12. The storage controller 12 controls storage devices in a storage array 14. The storage array 14 comprises a tray 1, 16, a tray 2, 18, through a tray M, 20 (collectively referenced as trays 22). Tray 1, 16, comprises storage devices such as storage device 1-1 (SD 1-1), 24, storage device 1-2 (SD 1-2), 26, through storage device 1-N (SD 1-N), 28. Tray 2, 18, comprises storage devices such as storage device 2-1 (SD 2-1), 30, storage device 2-2 (SD 2-2), 32, through storage device 2-N (SD 2-N), 34. Tray M, 20, comprises storage devices such as storage device M-1 (SD M-1), 36, storage device M-2 (SD M-2), 38, through storage device M-N (SD M-N), 40. Storage devices SD 1-1, 24, through SD M-N, 40, comprise the storage devices of the storage array 14 and are collectively referenced as storage devices 42.

Each of the storage devices 42 is assigned to a redundant array of independent disks (RAID) for fault protection and recovery. The storage system 100 comprises a RAID array 1, 44, a RAID array 2, 46, through a RAID array N, 48, collectively referenced as RAID arrays 50. System 10 configures the RAID arrays 50 to comprise one of the storage devices 42 on each of the trays 22. The RAID array 1, 44, comprises SD 1-1, 24, SD 2-1, 30, through SD M-1, 36. The RAID array 2, 46, comprises SD 1-2, 26, SD 2-2, 32, through SD M-2, 38. The RAID array N, 48, comprises SD 1-N, 28, SD 2-N, 34, through SD M-N, 40.

Each of the RAID arrays 50 comprises no more storage devices 42 per each of the trays 22 than the fault tolerance of the RAID scheme of the RAID arrays 48. For instance, a RAID 5 scheme can tolerate the loss of one storage device in the corresponding RAID 5 array. Consequently, each of the trays 22 in a RAID 5 scheme comprises no more than one storage device per RAID 5 array. One embodiment of such a layout is shown in FIG. 1. For a RAID 6 array, each of the trays 22 can comprise at most two storage devices per RAID 6 array. One embodiment of system 10 for RAID 6 and higher fault tolerant arrays restricts each array to a single storage device per tray, thereby retaining fault tolerance even during tray removal.

Figure 2:
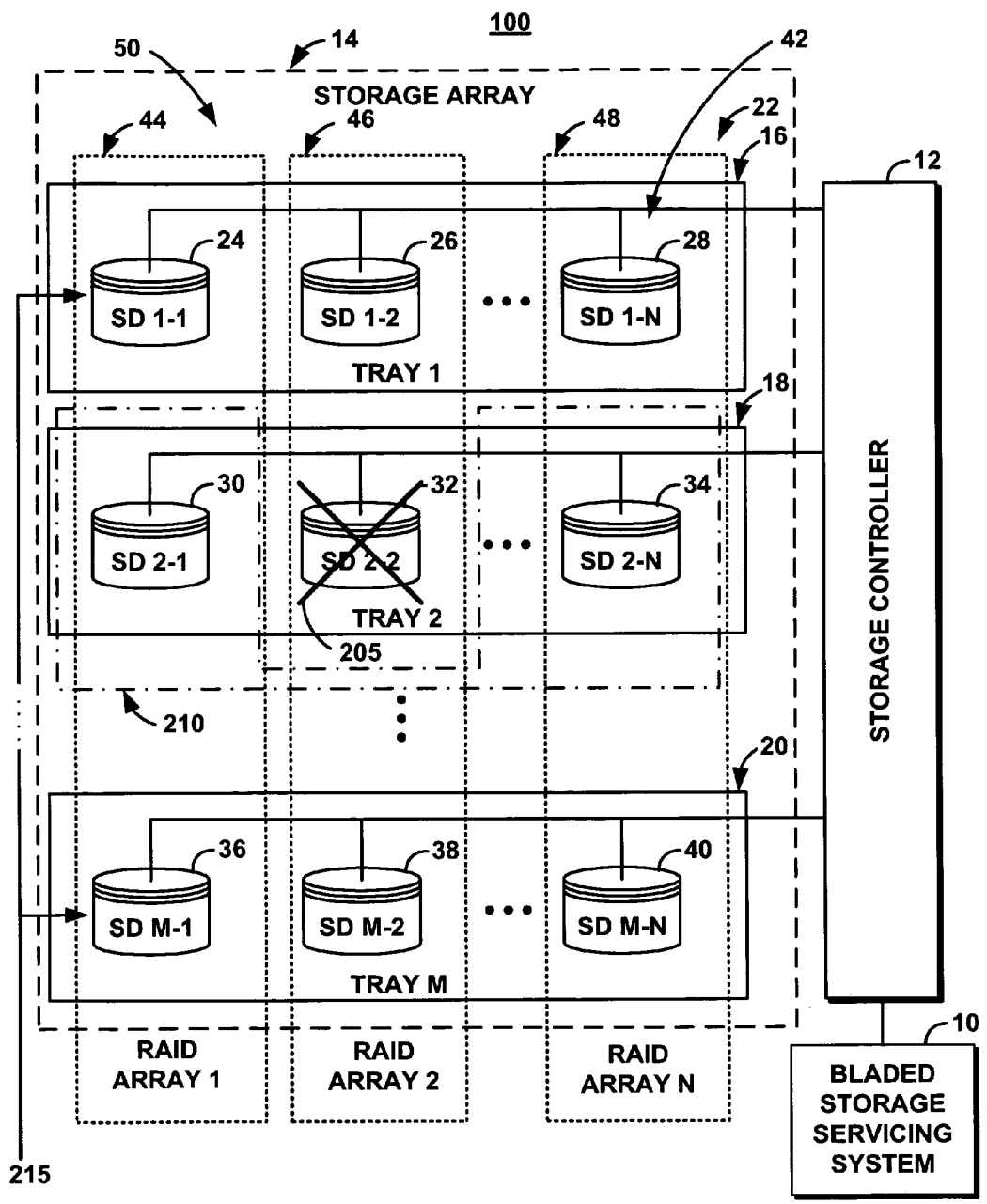
FIG. 2 is a schematic illustration of the storage system array of FIG. 1 comprising a failed storage device for which the bladed storage servicing system of the present invention can be used.

In routine operation of the storage system 100, one of the storage devices 42 may fail. FIG. 2 illustrates an exemplary failed storage device, SD 2-2, 32, designated by an "X" 205.

Figure 3A:
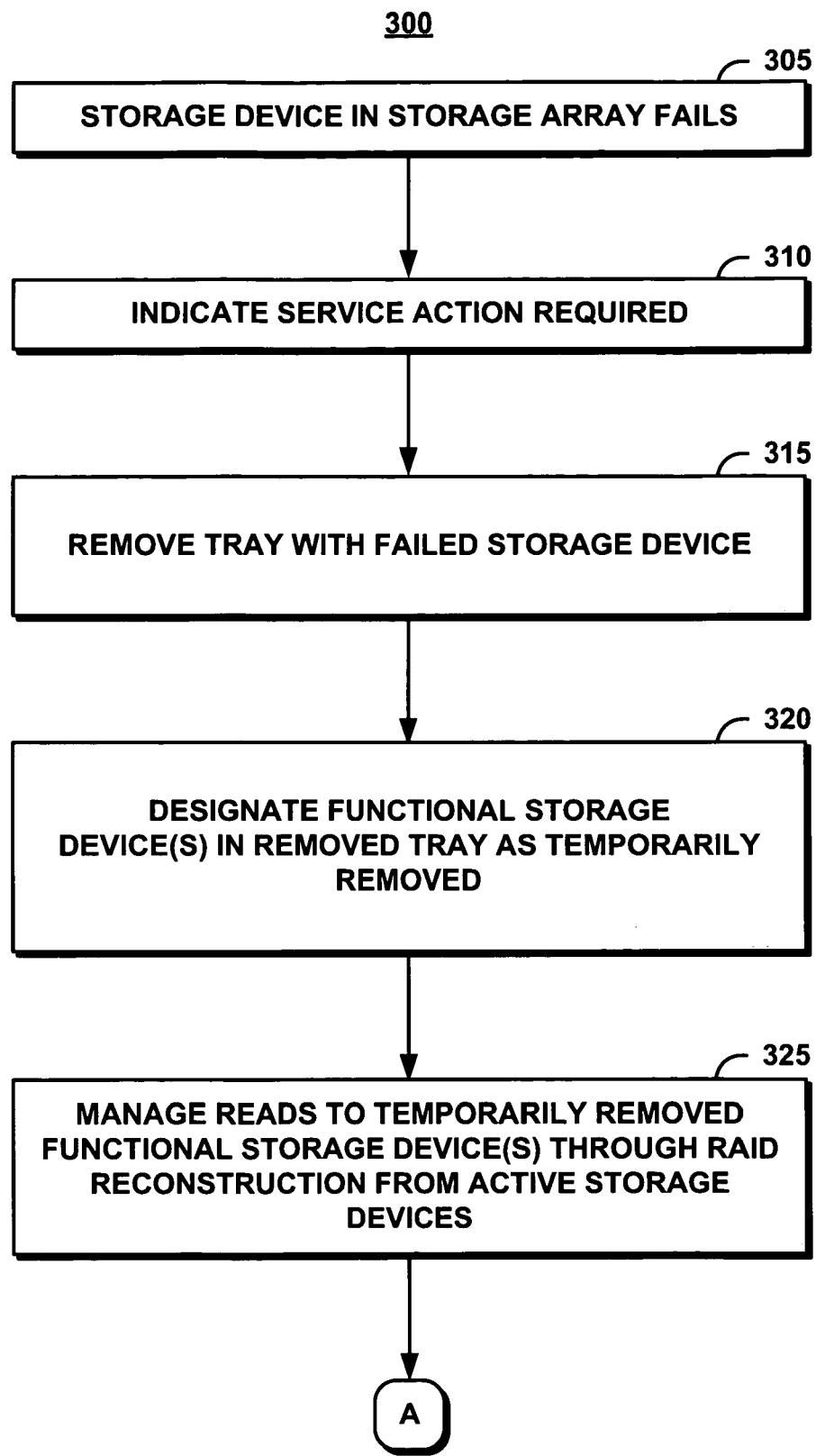
FIG. 3 is comprised of FIGS. 3A and 3B and represents a process flow chart illustrating a method of operation of the bladed storage servicing system of FIG. 1.
Figure 3B:
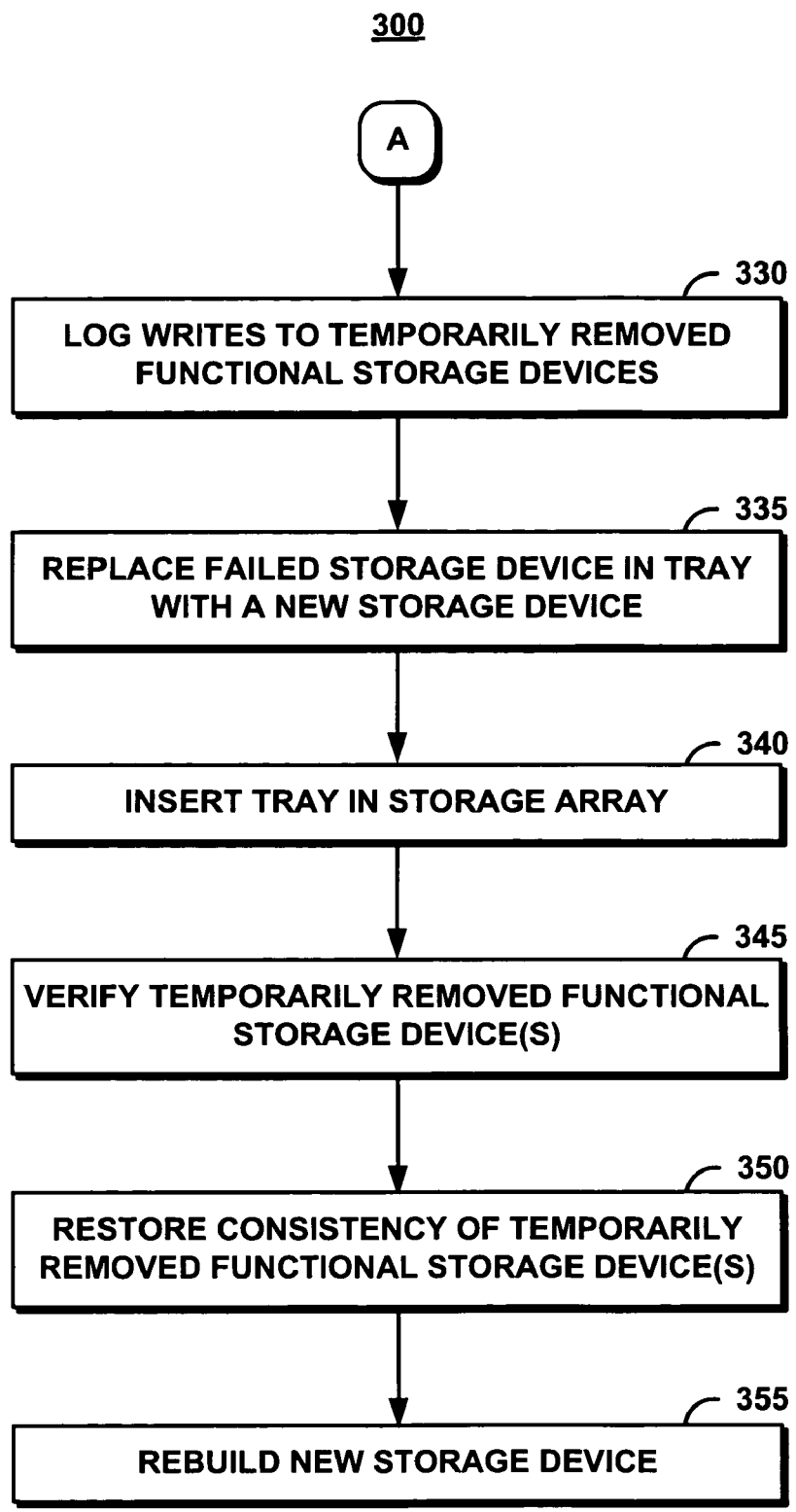

FIG. 3 (FIGS. 3A) illustrates a method 300 of system 10 in enabling removal and replacement of a failed storage device from a storage array. In operation, and with further reference to FIG. 2, the failed storage device is designated as SD 2-2, 32. Functional storage devices on tray 2, 18, are collectively referenced as functional storage devices 210.

The tray 2, 18, of the failed storage device SD 2-2, 32, can be removed from the storage array 14 for a short duration. Allowable durations can be as long as 15 minutes, with a typical removal duration of approximately 5 minutes. Removal of the tray 2, 18, is allowed provided each of the RAID arrays 50 can tolerate the removal of a single storage device in their present state. During the interval when the tray 2, 18 is removed, the storage array 14 is still operational. Storage devices 42 not on tray 2, 18, are referenced as active storage devices 215.

A storage device in the storage system 100 fails (step 305). In the example of FIG. 2, the storage device SD 2-2, 32, fails. System 10 indicates to the user or service representative that storage array 14 requires service (step 310). The service action includes removing tray 2, 18, replacing failed drive SD 2-2, 32 and re-inserting tray 2, 18 into storage array 14. When system 10 detects that tray 2, 18 has been removed, it designates the functional storage devices 210 as temporarily removed. This causes the storage controller 12 to quiesce the functional storage devices 210 on the tray and not issue any more I/Os to the functional storage devices 210. From this point until the tray 2, 18, is reinserted with the failed storage device SD 2-2, 32, being replaced, writes to the functional storage devices 210 on the tray 2, 18, are logged. Reads to the functional storage devices 210 are serviced by reconstructing data from the remaining storage devices in the respective arrays.

A user or service representative removes the tray 18 with the failed storage device (SD 2-2, 32) from the storage array 14 (step 315). System 10 detects this removal and designates the functional storage devices 210 in the tray 2, 18, as temporarily removed (step 320). Optionally, the user or service representative may signal to system 10 just before the tray is removed so that the functional storage devices may be quiesced before the tray is removed. The detection of tray removal can be through several means. In one embodiment, a hardware signal from the tray indicates removal. In another embodiment, enclosure services provide notifications to system 10 about tray removal. In yet another embodiment, system 10 detects removal when issuing i/o operations to any of the functional storage devices 210 and finds that these devices are absent.

System 10 manages reads to the temporarily removed functional storage devices 210 through RAID reconstruction from the active storage devices 215 (step 325). Reads that are addressed to the temporarily removed functional storage devices 210 that cannot be satisfied from the cache of the storage controller 12 are serviced by reconstructing the data from the active storage devices 215.

System 10 logs writes to the temporarily removed functional storage devices 210 (step 330). Writes that are addressed to the temporarily removed functional storage devices 210 are completed by writing to the redundancy in corresponding RAID arrays 50, i.e., updating relevant parities. The user or service representative replaces the failed storage device SD 2-2, 32, with a new storage device SD 2-2, 32 (step 335) and inserts tray 2, 18, into a chassis of the storage array 14 (step 340).

System 10 verifies the identities of the temporarily removed functional storage devices 210 (step 345). System 10 ensures that the functional storage devices 210 reinserted following a maintenance action are the same storage devices as those storage devices originally removed on tray 2, 18. This verification is required because gross data corruption can occur if a different storage device has been reinserted and not detected. In one embodiment, the vital product data of the functional storage devices 210 can be noted by the controller and verified on reinsertion. The vital product data comprises items such as a serial number.

For devices and interfaces that do not support vital product data information, the functional storage devices 210 can be identified by recording a signature on a reserved area of each of the functional storage devices 210. The signature can comprise other elements binding the functional storage devices 210 to the tray 2, 18, the storage array 14, or the storage system 100 such as controller identification, slot, physical identification, and time stamp of the start of the removal operation. On reinsertion, the signature can be verified before accepting the functional storage devices 210 and applying the log. If the verification fails, system 10 may notify the user or service representative that identities do not match. Based on the user response, system 10 may then assume that a new storage device has been inserted and the entire data requires rebuilding instead.

System 10 restores consistency of the temporarily removed functional storage devices 210 (step 350). When the tray 2, 18, is reinserted, the log is used to bring the functional storage devices 210 back to consistency by performing the logged writes on the functional storage devices 210. The log holds the addresses and lengths of the write operations on the functional storage devices 210 at a minimum. The data of the writes can be obtained by reconstructing data from the active storage devices 215. The log may optionally hold the data for these write operations. System 10 rebuilds the new storage device SD 2-2, 32 (step 355).

Following a typical maintenance action, the time taken to bring the functional storage devices 210 back to consistency is small, typically seconds and usually less than approximately a minute.

The size of the log in terms of number of entries and the rate of write operations on the removed storage device determines the window of time for the maintenance action of method 300. However, if the log overflows, the replacement of a failed storage device is no longer treated as a temporary removal. In this case, on reinsertion, the functional storage devices 210 require rebuilding. System 10 may optionally notify the user or service representative depending on a configurable threshold that a log overflow event may be likely unless the tray is reinserted within a specific duration.

System 10 does not impose any requirements on RAID level other than requiring redundancy between the storage devices. Consequently, system 10 does not affect the storage efficiency of the array. System 10 does not require the use of "hot spares". Moreover, a maintenance action can be performed immediately after a storage device fails since there are no lengthy operations such as a relocation requiring completion. System 10 is independent of the number of storage devices per tray.

During the window of maintenance action, the affected RAID arrays 48 may be running in critical mode if the removed tray contains a number of storage devices from a RAID array equal to the fault tolerance of the RAID array. However, for the typical duration of maintenance actions, the exposure to data loss is very small and does not significantly affect the overall reliability of the storage system 200. Reliability calculations show that the need for higher fault-tolerant RAID arrays is driven more by the base reliability of a given RAID level obtained through storage device failure, hard error rates, and expected rebuild times than by additional exposure during maintenance action.

Figure 4:
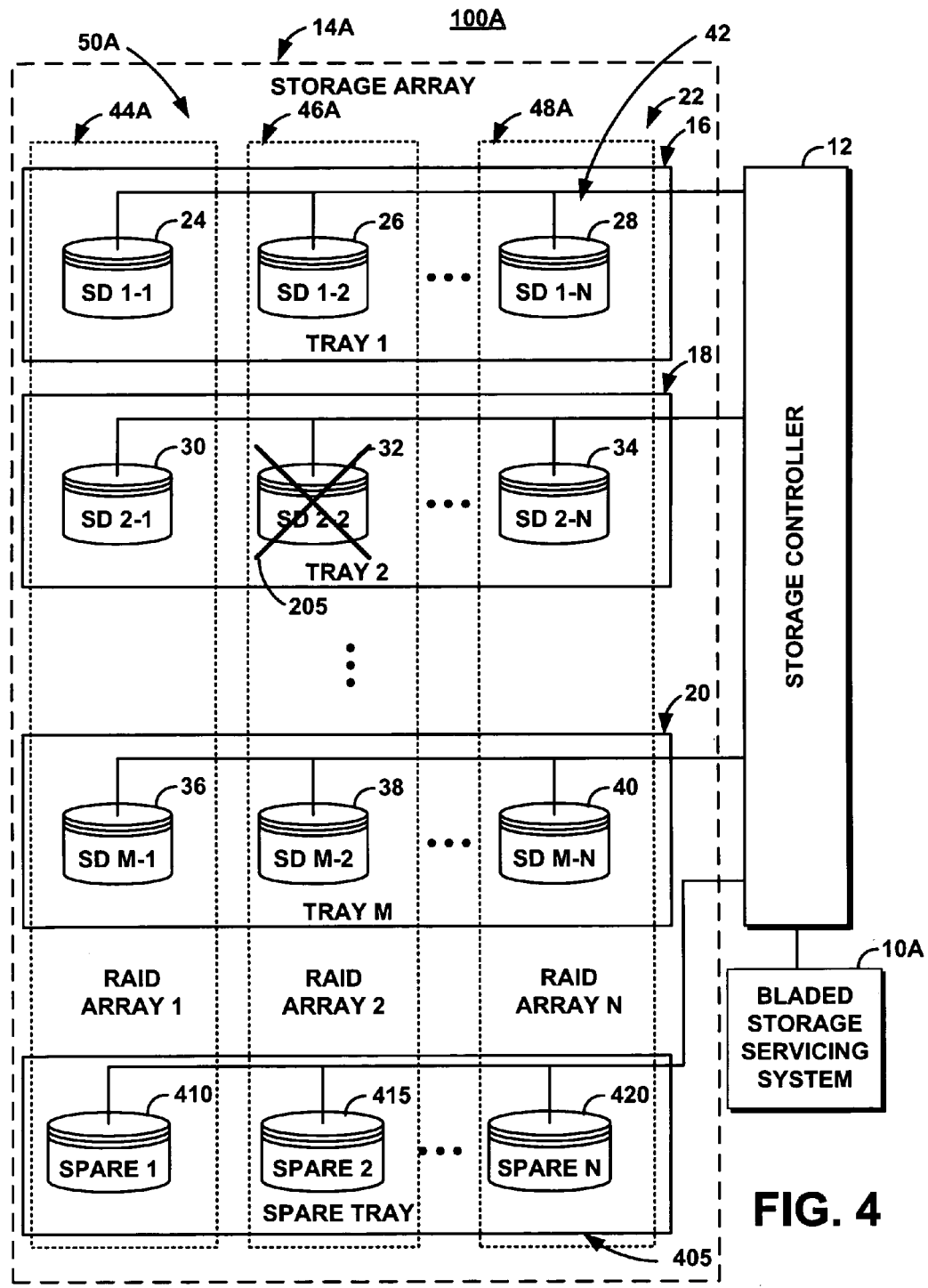
FIG. 4 is a schematic illustration of a storage system array comprising a failed storage device for which the bladed storage servicing system of the present invention can be used in conjunction with a spare tray.

FIG. 4 illustrates one embodiment of system 10A in which the failed storage device SD 2-2, 32, is rebuilt on a spare storage device on a spare tray 405. The spare tray 405 comprises spare storage device 1 (spare 1), 410, spare storage device 2 (spare 2), 415, through spare storage device N (spare N), 420. The failed storage device SD 2-2, 32, is rebuilt on spare 2, 415, which is part of the raid array 2, 46. Replacement to the failed storage device 2-2, 32, is treated as a spare storage device as the spare 2, 415, assumes the functions of the failed storage device SD 2-2, 32.

The present invention may also be used to temporarily remove functional storage devices for general service needs and not necessarily only for replacement of failed storage devices.

It is to be understood that the specific embodiments of the invention that have been described are merely illustrative of certain applications of the principles of the present invention. Numerous modifications may be made to the system and method for servicing storage devices in a bladed storage system described herein without departing from the spirit and scope of the present invention.

What is claimed is:

1. A method of servicing storage devices in a storage subsystem, said storage subsystem including a plurality of removable trays, each of said trays with a plurality of functional storage devices, the method comprising:
    initially designating as temporarily removed, one or more functional storage devices in a tray of the storage subsystem;
    upon removal of the tray from the storage subsystem, logging at least some writes to the one or more functional storage devices in the tray to a log maintained at another one of said storage devices in said storage subsystem;
    notifying, responsive to a configurable threshold, a user or a service representative that said log may overflow unless the tray is reinserted within a specific duration; said specific duration calculated using a number of entries in said log and a rate of write operations to said one or more functional storage devices;
    deciding, responsive to overflow of said log due to said write operations if said removal was temporary or was a reinsertion; said reinsertion requiring a rebuilding of data;
    managing reads to the functional storage devices through reconstruction from at least some active storage devices in the storage subsystem that are not removed from the storage subsystem;
    upon reinsertion of the tray in the storage subsystem, verifying an identity of the tray by checking one or more of a serial number, a controller identification, a slot, a physical identification and a timestamp of a start of removal operation;
    if said verifying fails, then notifying said user or said service representative; and
    resynchronizing the functional storage devices in the tray to ensure data consistency.

2. The method of claim 1, wherein the storage subsystem comprises a RAID layout.

3. The method of claim 2, wherein the RAID layout comprises a maximum number of storage devices per tray that does not exceed a number allowed by the fault tolerance of a RAID scheme.

4. The method of claim 1, wherein the functional storage devices in the reinserted tray are resynchronized by performing the logged writes on the functional storage devices.

5. The method of claim 4, wherein the logged writes comprise addresses and lengths of the writes on the functional storage devices.

6. The method of claim 1, wherein managing the reads to the functional storage devices comprises managing through RAID reconstruction from the active storage devices.

7. The method of claim 1, wherein the storage subsystem comprises a bladed storage subsystem.

8. The method of claim 1, wherein the storage subsystem includes a failed storage device; and
    further comprising replacing the failed storage device prior to reinsertion of the tray in the storage subsystem.

9. The method of claim 1, further comprising restoring consistency of the temporarily removed functional storage devices upon reinsertion of the tray in the storage subsystem.

* * * * *